United States Patent [19]
Lee et al.

[11] 3,874,698
[45] Apr. 1, 1975

[54] ARTICULATED HAULAGE VEHICLE

[75] Inventors: Arthur L. Lee; Arthur B. Coval, both of Columbus, Ohio

[73] Assignee: FMC Corporation, Chicago, Ill.

[22] Filed: Apr. 4, 1973

[21] Appl. No.: 347,646

[52] U.S. Cl. .............................................. 280/408
[51] Int. Cl. ............................................. B60d 1/00
[58] Field of Search ...... 280/400, 408, 483; 180/14, 180/24; 214/83.36; 198/109; 299/64–68

[56] References Cited
UNITED STATES PATENTS

| | | | |
|---|---|---|---|
| 1,662,376 | 3/1928 | Delpini | 280/408 |
| 2,251,584 | 8/1941 | Fageol et al. | 280/403 |
| 3,175,709 | 3/1965 | Sibley | 214/83.36 |
| 3,185,324 | 5/1965 | Breithaupt et al. | 214/83.36 |
| 3,302,739 | 2/1967 | Beck et al. | 180/24 |
| 3,501,033 | 3/1970 | Bunchak | 214/83.36 |
| 3,516,508 | 6/1970 | Lee et al. | 180/85 |

*Primary Examiner*—Leo Friaglia
*Assistant Examiner*—Randall Schrecengost
*Attorney, Agent, or Firm*—Stanley J. Price, Jr.

[57] ABSTRACT

The haulage vehicle has a frame member with separate front and rear sections that are connected to each other by universal means and are free to articulate in a plurality of planes. The frame rear section has a transversely mounted rear axle adjacent the rear portion on which a pair of propelling wheels are mounted and a transversely mounted intermediate axle adjacent the front portion of the frame rear section on which a pair of intermediate propelling wheels are mounted. The frame front section has a transversely mounted front axle on which a pair of front propelling wheels are mounted. Separate propelling motors are mounted adjacent each of the propelling wheels and are drivingly connected to the adjacent propelling wheel. All of the propelling wheels are steerable and the drive motors are movable therewith. A body member is supported on the frame rear section and a boom member is supported on the frame front section. The boom member is connected to the body member by a plurality of longitudinally extending flexible plates, so that the boom and body members are free to articulate in a plurality of planes. Endless conveying means are positioned in the longitudinal haulage compartment formed by the body and boom members. With this arrangement all of the propelling wheels on the haulage vehicle remain in contact with the ground as the haulage vehicle moves over uneven terrain and the haulage vehicle follows the contour of the uneven terrain.

6 Claims, 31 Drawing Figures

ARTICULATED HAULAGE VEHICLE

BACKGROUND OF THE INVENTION

1. Field of the Invention

This invention relates to an articulated haulage vehicle having separate body and boom members supported by a frame member with six propelling wheels mounted thereon and more particularly to an articulated haulage vehicle having separate body and boom members supported on a frame member in which front and rear sections of the frame member are free to articulate in a plurality of planes.

2. Description of the Prior Art

Articulated haulage vehicles are disclosed in U.S. Pat. Nos. 2,962,176; 3,185,324; 3,302,739; 3,443,655; 3,490,625; 3,501,033 and 3,516,508.

The haulage vehicles disclosed in the above enumerated United States patents that have six wheels all include a pair of body sections pivotally connected to each other by a hinge pin connection adjacent to the intermediate pair of wheels. The hinge pin connection between the body sections limits the articulation of the haulage vehicle body sections to a single plane, so that all of the wheels do not remain in contact with the ground as the vehicle moves over uneven terrain and the haulage vehicle does not follow uneven terrain. The haulage vehicle disclosed in U.S. Pat. No. 2,962,176 is limited to providing traction for the vehicle only through the pair of intermediate propelling wheels. In U.S. Pat. No. 3,185,324 the pairs of intermediate and rear wheels are driven to thus provide traction through four of the six wheels on the haulage vehicle. The drive means for the haulage vehicle disclosed in U.S. Pat. No. 3,302,739 includes motorized wheels in which drive motors are housed within the periphery of each of the wheels to thus provide traction to all six wheels of the haulage vehicle.

In U.S. Pat. No. 3,516,508 there is disclosed a four wheel haulage vehicle having a unitary flexible body mounted on rigid axle assemblies. The body is constructed to articulate in a plurality of planes to maintain all four wheels in contact with uneven terrain.

There is a need for a six wheel haulage vehicle that is capable of articulating in a plurality of planes so that all of the wheels remain in contact with the uneven terrain and also a six wheel haulage vehicle in which all of the wheels are propelling wheels and are driven by separate drive motors positioned adjacent to the respective wheels.

SUMMARY OF THE INVENTION

In accordance with the invention there is provided an articulated haulage vehicle that has a frame member with a front section and a rear section. Means are provided for connecting the front section to the rear section to permit articulation therebetween. A pair of rear wheels are mounted on opposite sides of the frame member rear section adjacent the rear portion of the frame member rear section. A pair of intermediate wheels are mounted on opposite sides of the frame member rear section adjacent the front portion of the rear section. A pair of front wheels are mounted on opposite sides of the frame member front section adjacent the front end portion of the frame member front section. A body member having a longitudinally extending haulage compartment therein is mounted on the frame member rear section. A boom member having a longitudinally extending haulage compartment therein is mounted on the frame member front section. Flexible means connects the boom member to the body member to permit articulation therebetween.

The pairs of rear wheels, intermediate wheels and front wheels are both driven and steerable and separate drive motors are provided for each of the driven wheels. The flexible means connecting the boom member to the body member includes means to permit articulation between the body member and boom member in a plurality of different planes.

With the above arrangement, there is now provided a six wheel haulage vehicle in which each of the wheels is a propelling wheel and is propelled by a separate motor positioned adjacent thereto. The universal and flexible connections between the frame sections and the body and boom members permits the vehicle to articulate in a plurality of planes and thus follow the contour of uneven terrain while all of the propelling wheels remain in contact with the ground as the vehicle moves over uneven terrain.

Accordingly, the principal object of this invention is to provide a six wheel haulage vehicle capable of articulating in a plurality of planes and follow the contour of uneven terrain.

Another object of this invention is to provide a six wheel articulated haulage vehicle in which all of the wheels remain in contact with the ground as the vehicle moves over uneven terrain.

These and other objects and advantages of this invention will be more completely disclosed and described in the following specification, the accompanying drawings and the appended claims.

BRIEF DESCRIPTION OF THE DRAWINGS

FIG. 8c is a fragmentary view in elevation taken along the line 8c—8c in FIG. 8a.

DESCRIPTION OF THE PREFERRED EMBODIMENTS

Referring to the drawings and particularly FIGS. 1 - 12 there is illustrated a haulage vehicle generally designated by the numeral 10 that includes a frame member 12 which supports a body member 14 and a boom member 16. The frame member 12 is illustrated in detail in FIGS. 3 and 4 and includes a pair of spaced parallel and longitudinally extending side frame members generally designated by the numerals 18 and 20. The side frame members 18 and 20 each has an angular configuration in elevation with a horizontal flange or base portion 22 and a vertical flange or wall 24. The right side frame member 18 has a rear section 26 and a front section 28 that are connected to each other by means of the flexible connecting device generally designated by the numeral 30. Similarly, the left side frame 20 has a rear section 32 and a front section 34 that are connected by means of a similar flexible connecting device 30.

Figures 3, 3A:
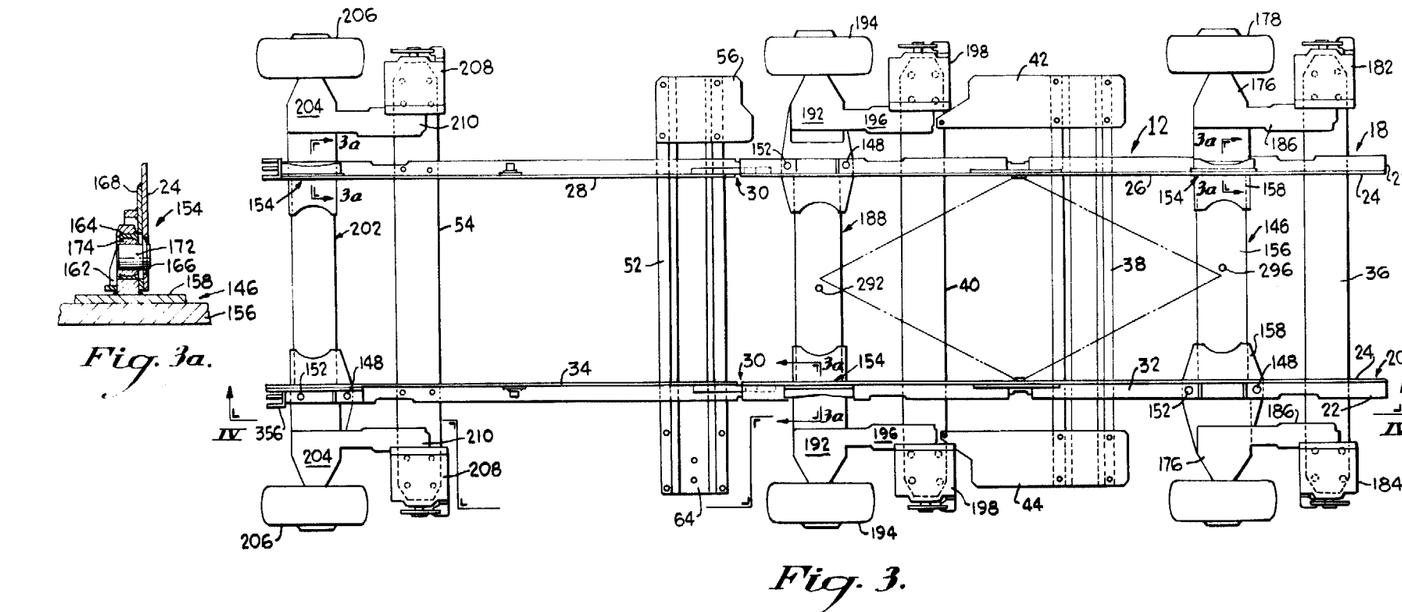
FIG. 3 is a top plan view of the vehicle frame on which the vehicle body, vehicle boom, propelling wheels, drive motors and the like are mounted.
FIG. 3a is a fragmentary view in section taken along the line 3a—3a in FIG. 3, illustrating the manner in which one end of the transverse axle assemblies are connected to the vehicle frame side members.

The rear side frame sections 26 and 32 are connected in spaced parallel relation to each other by transverse beams or plates 36, 38 and 40. The beam 36 extends beyond the side frames 18 and 20 and is arranged, as later discussed, to support the drive motors for the rear pair of propelling wheels. The transverse member 38 also extends beyond the side frames 18 and 20 and has longitudinally extending pads 42 and 44 secured thereto. The pad 42 is arranged to support the controller 46 (FIG. 1) and the hydraulic pump motor 48. The pad 44 secured to the transverse beam 38 on the left side of the haulage vehicle is arranged to support the traction control box 50 that houses electrical controls such as contactors, switches and the like for the propelling motors. The transverse beam 40 is arranged to support the drive motors for the intermediate propelling wheels, as later discussed.

Figures 1, 1C:
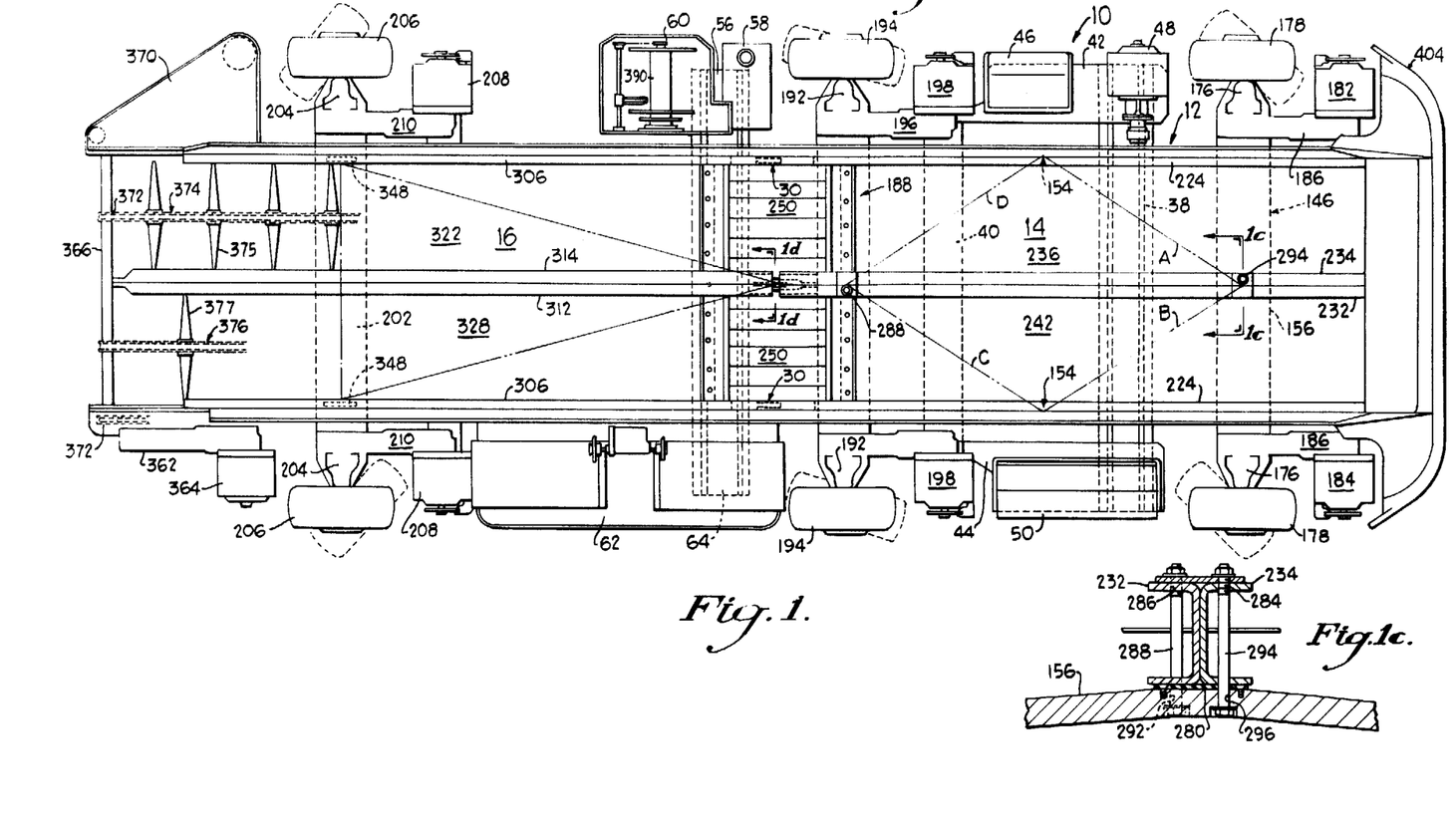
FIG. 1 is a top plan view of one embodiment of the haulage vehicle.
FIG. 1c is a fragmentary view in elevation taken along the line 1c—1c in FIG. 1, illustrating the manner in which the vehicle body is secured to the vehicle frame.

The front sections 28 and 34 of the side frames 18 and 20 are connected to each other in spaced parallel relation by transverse beams 52 and 54. The beam 52 extends beyond the side frame members 18 and 20 and has a pad 56 secured thereto that supports a hydraulic tank 58 and a portion of the cable reel housing 60, as illustrated in FIG. 1. The operator's compartment 62 is supported by the end portion 64 of transverse beam 52 on the left side of the haulage vehicle 10. The wiring for the electric motors, the hydraulic hoses for the fluid actuated components and the steering apparatus have been omitted to more clearly illustrate the novel structural features of the haulage vehicle 10.

Figure 4:
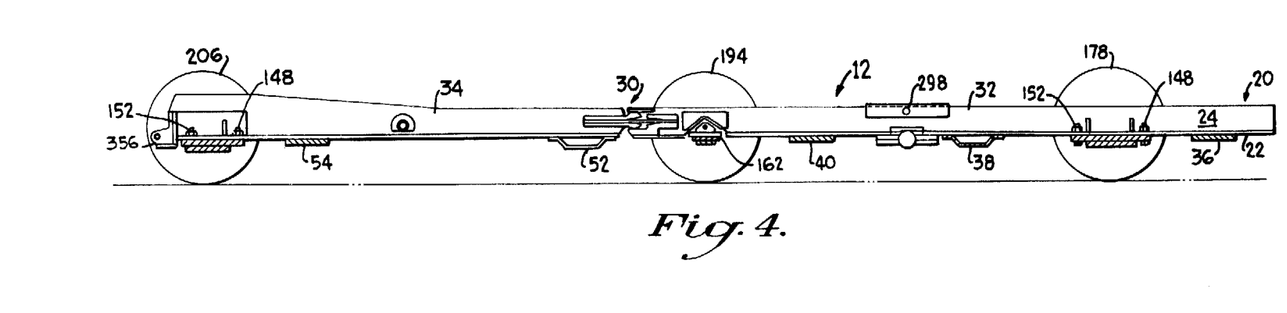
FIG. 4 is a view in section and side elevation taken along the line IV—IV of FIG. 3, illustrating the manner in which the sections of the vehicle frame longitudinal side members are connected to each other.
Figure 11:
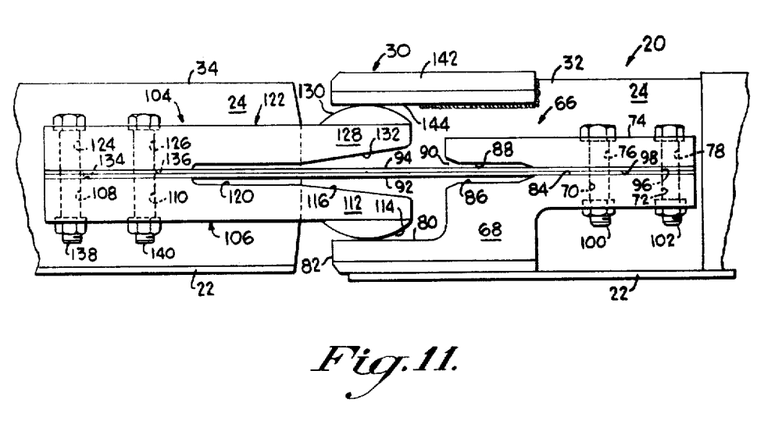
FIG. 11 is an enlarged view in side elevation of the flexible connection between the vehicle frame side member sections.
Figure 12:
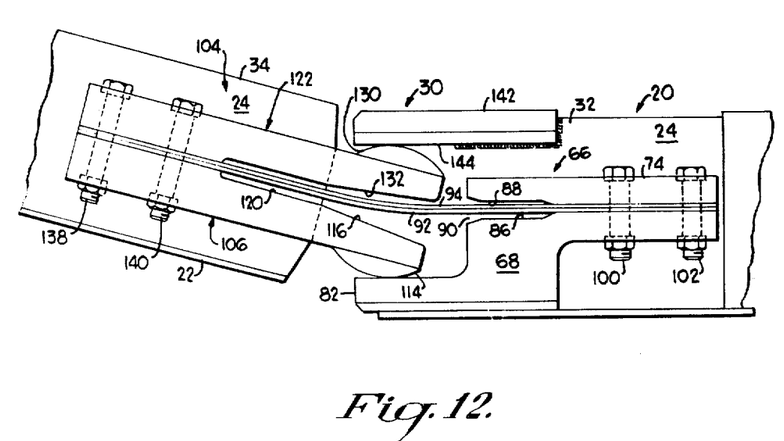
FIG. 12 is a view similar to FIG. 11, illustrating the flexible connection of FIG. 11 in a deflected position.

Referring particularly to FIGS. 4, 11 and 12 there is illustrated in detail the flexible connecting device 30 between side frame member sections 26 and 28 and between the other side frame sections 32 and 34. The flexible connecting device 30 will be described with reference to left side frame member 20 and it should be understood that a similar flexible connecting device 30 is employed to connect sections 26 and 28 of the right side frame 18.

The flexible connecting device 30 includes a first flexible strap engaging device 66 that has a body portion 68 secured to the horizontally extending base 22 of side frame member 20 and has vehicle bolt holes 70 and 72 therethrough. A top plate or cap portion 74 is positioned in overlying relation with the base portion 68 and has aligned vertical bolt holes 76 and 78. The body portion 68 has a bearing surface 80 adjacent the front end 82, a rear clamping surface 84 and an intermediate upper surface 86. The intermediate upper surface 86 mates with a lower surface 88 of the top plate 74 and forms a longitudinal recess 90 therebetween in the first flexible strap engaging device 66.

A pair of flexible strap members 92 and 94, preferably fabricated from high tensile flexible steel, are positioned in overlying relation with each other and have pairs of rear apertures 96 and 98 that are aligned with the bolt holes in the body portion 68 and top plate 74. Bolts 100 and 102 extending through the respective aligned bolt holes in the top plate 74 and body portion 68 with the strap members 92 and 94 therebetween rigidly secure the rear portion of the flexible strap members 92 and 94 to the engaging device 66 with the front portions of strap members 92 and 94 extending forwardly therefrom.

The front side frame member section 34 has a second strap engaging device 104 secured to the vertical wall 24 of side frame section 34 adjacent the side frame section rear end portion. The engaging member 104 has a bottom portion 106 with a pair of bolt holes 108 and 110 extending vertically therethrough and a rearwardly extending bearing portion 112. The bearing portion 112 has a semi-spherical base 114 that abuts the bearing surface 80 of engaging member 66 and an inclined upper surface 116. The bottom member 106 has a strap engaging rear upper surface 118 and an intermediate upper surface 120.

The second strap engaging device 104 has a top plate or cap member 122 with a pair of vertical bolt holes 124 and 126. The rear bearing portion 128 of top plate 122 has an upper semi-spherical bearing surface 130 and a lower inclined surface 132. The front end portions of strap members 92 and 94 have bolt holes 134 and 136 therethrough that are aligned with the bolt holes in the members 106 and 122. Bolts 138 and 140 secure the straps between the members 106 and 122 to flexibly connect the side frame rear section 32 to the side frame front section 34. A bearing plate 142 is secured to the vertical wall 24 of the side frame rear portion 32 and has a bearing undersurface 144 that abuts the spherical bearing surface 130 of cap member 122. The inclined surfaces 116 and 132 of respective bearing portions 112 and 128 provide a recessed portion for flexing of the straps 92 and 94 on an elongated radius to prevent sharp bends and crimping in the straps 92 and 94. With this arrangement the respective side frame sections 32 and 34, because of the flexible properties of the straps 92 and 94, are free to flex in all planes including longitudinally extending planes and planes transverse to the longitudinal axis of the side frames. The spherical bearing surfaces 114 and 130 permit the transverse flexing of the side frame members 18 and 20 to maintain all of the propelling wheels in contact with an undulating haulageway, as later discussed. Further, the flexible connecting device 30 may be quickly disassembled to disconnect the front end of the haulage vehicle frame, i.e., the portion containing the side frame sections 28 and 34, from the rear portion of the frame containing side frame sections 26 and 32. This quick disconnect facilitates assembly and disassembly of the haulage vehicle so that the haulage vehicle may be taken into underground mines in sections. As later discussed, the body member 14 and the boom member 16 may also be quickly and easily positioned on and removed from the frame to further facilitate transporting components of the haulage vehicle.

Referring to FIGS. 3 and 3a, the axle assemblies for supporting the propelling wheels and the manner in which the axle assemblies are connected to the frame side members is illustrated. The rear axle assembly 146 extends transversely between the side frame members 18 and 20 and is rigidly secured to the horizontal flange portion 22 of side frame 20 by means of bolts 148 and 152. The axle assembly 146 is connected to the side frame 18 by a spherical bearing type universal connection or coupling generally designated by the numeral 154 and illustrated in detail in FIG. 3a.

Referring to FIG. 3a, the axle assembly 146 has a base plate member 156 with a wheel unit support pad 158 thereon. An upstanding connecting member 162, also illustrated in FIG. 4 with reference to the intermediate axle assembly, is secured to wheel unit support pad 158 and has a receiving socket 164 of a generally semi-spherical configuration. The side frame vertical flange 24 has an aperture 166 therethrough with a backing plate 168. A pin member 172 extends through the aperture 166 and has a spherical bearing end portion 174 that is positioned in socket 164 mounted on the axle assembly 146. The pin 172 is suitably secured to the side frame vertical flange 24 to thus provide a universal connection between the longitudinal side frame 18 and the axle assembly 146. Driven, steerable wheel units 176 having propelling wheels 178 mounted thereon are suitably connected to the wheel unit support pads 158 secured to the ends of plate 156 of assembly 146. Reversible drive motors 182 and 184 are suitably supported on the ends of transverse beam 36 and are connected to the wheel units 176 by gearing within a reducer housing 186. With this arrangement, the right rear wheel 178 is driven in both directions by means of right rear drive motor 182 and the left rear wheel 178 is driven in both directions by the left rear drive motor 184 through the gearing in housing 186. Both rear wheels 178 are steered and driven by separate drive motors. The entire axle assembly 146 is free to flex along a transverse axis by means of the universal connection 154 and the rear propelling wheels 178 can change elevation and remain in contact with a transverse inclined surface of a haulage way without transmitting undue twisting forces into the side frames 18 and 20.

An intermediate axle assembly 188 is of substantially the same construction as the rear axle assembly 146 and includes a universal connection 154, as previously described, between the axle assembly 188 and the vehicle side frame member 20. The axle assembly 188 is rigidly secured to the horizontal flange 22 of right side frame 18 by bolts 148 and 152. The axle assembly 188 has wheel units 192 supported on the ends thereof with intermediate propelling wheels 194 mounted thereon. The wheel units 192 are arranged to permit the intermediate wheels to be steered and suitably connects the intermediate wheels 194 through gearing in housing 196 to separate drive motors 198. With this arrangement, the intermediate axle assembly 188 is universally connected to the side frame member 20 in a manner similar to rear axle assembly 146 and has a pair of steered and separately driven wheels 194 mounted thereon.

A front axle assembly 202 is similar in many respects to the previously described rear axle assembly 146 and intermediate axle assembly 188 and has a universal type connection similar to the previously described connection 154 that connects the front axle assembly 202 to the right side frame 18. The axle assembly 202 is fixedly secured by bolts 148 and 152 to the horizontal flange 22 of side frame member 20. Wheel units 204 similar to the wheel units 192 and 176, previously described, support a pair of front wheels 206 that are similarly steerable through the respective wheel units 204 and are separately driven in both directions by separate motors 208 through gearing in housings 210. It should be noted that all of the motors 182, 198 and 208 are similar in construction and are similarly mounted on the vehicle frame. The wheel units 176, 192 and 204 are also of substantially the same construction and are interchangeable. The speed reducer housings 186, 196 and 210 connecting the respective motors to the wheel units are also of similar construction and interchangeable. The similarity and interchangeability of these components reduces substantially the number of repair and replacement parts required to be maintained in inventory. Further, with the above arrangement, the vehicle frame 12 with the axle assemblies mounted thereon may be articulated in any longitudinal or transverse plane within practical limits to maintain all six of the propelling wheels in contact with an uneven and undulating road surface so that all six wheels continue to provide traction for the haulage vehicle at all times.

Figure 13:
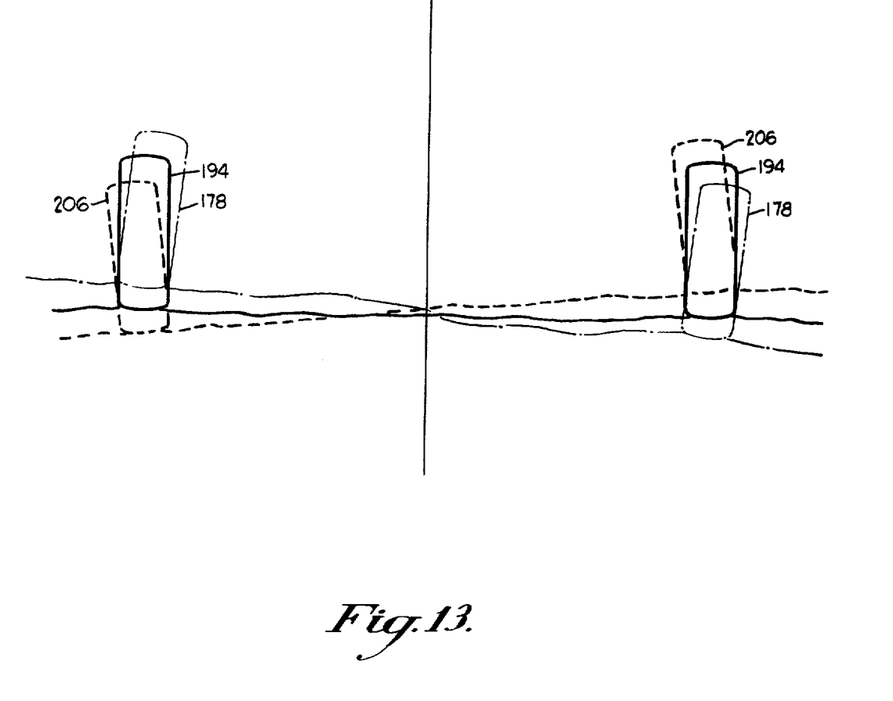
FIG. 13 is a schematic representation of the manner in which the six propelling wheels of the haulage vehicle remain in contact with undulating surfaces of a haulageway.

The ability of the vehicle to articulate both longitudinally and transversely is illustrated schematically in FIG. 13 where the front wheels 206 are designated by broken lines (— —) and the transverse inclination of the haulage way surface beneath the front propelling wheels 206 is illustrated by a broken line (— —). FIG. 13 is a view in elevation from the rear of the vehicle and, as illustrated, the road surface beneath the front wheels 206 is inclined transversely so that the right front wheel is substantially higher than the left front wheel. The previously described frame 12 and the axle assemblies maintain the front wheels 206 in contact with the road surface to provide traction through the front wheels 206 for the vehicle 10.

The intermediate wheels 194 are indicated in solid lines and the surface of the haulageway beneath the intermediate wheels is also indicated by a solid line. The surface of the roadway in the schematic illustration beneath the intermediate wheels 194 is substantially level and both of the intermediate wheels 194 are in contact with the road surface and provide traction for the haulage vehicle. Without the transverse articulation provided by means of the universal connections 154 and the flexible strap connection 30, the right intermediate wheel 194 would be elevated and at the same elevation as the front right propelling wheel 206 and would not be in contact with the road surface and would not be capable of providing traction for the haulage vehicle under the road surface conditions illustrated.

To further illustrate the transverse and longitudinal flexibility of the haulage vehicle, the rear propelling wheels 178 are schematically designated by dash-dot-dash lines (—·—). As viewed from the rear of the haulage vehicle, the road surface beneath the rear propelling wheels 178 is inclined transversely so that the right rear wheel 178 is below the left rear wheel and yet all six wheels are in contact with the road surface and each of the propelling wheels provide traction for the haulage vehicle. Essentially, with the undulations illustrated in FIG. 13 the vehicle has flexed transversely in two opposite directions. The front portion of the haulage vehicle, in order to follow the contour of the road surface, has flexed in a counter-clockwise direction about the axis of the vehicle and the vehicle rear portion has flexed in a clockwise direction about the axis of the vehicle.

The frame member 12 with the previously described components attached thereto forms a relatively complete vehicle and includes all of the elements or components necessary to propel and steer the vehicle. The frame 12 is constructed to receive any suitable type of body that would provide haulage compartments of various configurations for different types of material. For example, an elongated generally rectangular dump body could be suitably attached to the frame with dump jacks connected thereto to elevate one end of the body. Similarly, other conventional body types could be supported by the frame.

The preferred use for the haulage vehicle herein described is a shuttle type haulage vehicle arranged to transport dislodged material in a mine haulageway from a continuously advancing loading station to a fixed discharge station. The loading station is adjacent the mine face and the discharge station includes receiving apparatus such as a conveyor belt or mine cars located in a haulageway spaced from the mine face. The shuttle type haulage vehicle is capable of continuously transporting material as the loading station advances with the mine face during the mining operation. The shuttle type haulage vehicle employed for this purpose preferably has an elongated generally U-shaped haulage compartment with a bottom wall or floor portion and substantially vertical side walls. Endless conveying means are conventionally provided to convey the material along the floor of the haulage compartment and distribute the material throughout the haulage compartment as the vehicle is being loaded at one end by loading apparatus. The endless conveying means is also utilized to discharge material from the haulage compartment after the haulage vehicle has transported the dislodged material to the fixed discharge station.

It is also conventional with the shuttle type haulage vehicle to provide a boom member that is pivotally connected at one end and has elevating jack members at the discharge end of the vehicle so that the end of the boom member may be elevated and discharge the material into an elevated receiver at the discharge station. The endless conveyor along the floor of the haulage compartment is conventionally an endless chain type conveyor reeved about suitable end sprockets to provide an upper conveying reach and a return reach positioned therebelow. It should be understood, however, that the previously described frame member 12 with the components secured thereto is not limited to use as a frame for a body and boom member as hereinafter described and may be utilized with other types of body members having haulage compartments suitable for specific types of material and use.

Referring to FIGS. 1, 8, 9 and 10, the haulage vehicle body member 14 is illustrated in detail and includes a pair of upstanding side walls 224 and transverse straps 226 therebetween. The side walls 224 have inwardly extending flange portions 228 secured to the straps 226. Reinforcing straps 230 are secured to the transverse straps 226 to support the return reach of the endless conveyor. A pair of channels 232 and 234 are positioned in back-to-back abutting relation with the flange members extending outwardly therefrom and are secured to the straps 226. A floor plate 236 is positioned between the channel 234 and the upstanding wall 224 and is supported by means of angles secured to the respective channel 234 and side wall 224 to provide a return flight compartment 238 between the straps 226 and the floor plate 236. A similar floor plate 242 is secured by means of angles to the respective channel 232 and vertical side wall 224 to form compartment 240 between the plate 242 and the straps 226. An angle 244 is positioned in overlying relation with the abutting channels 232 and 234 and extends longitudinally along the body 14.

Figure 8:
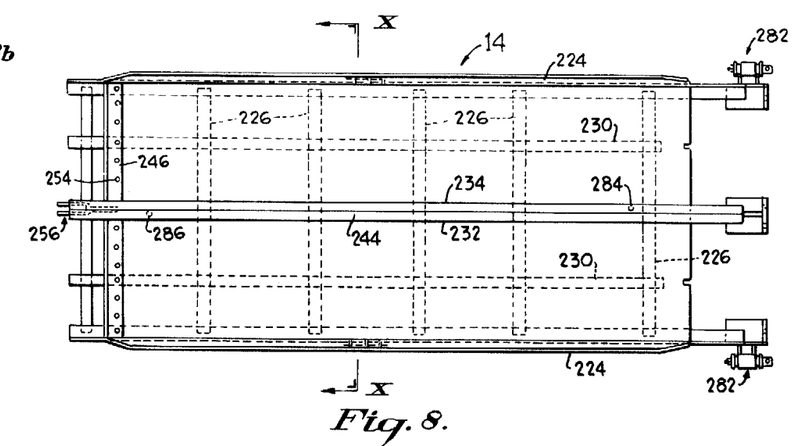
FIG. 8 is a top plan view of the vehicle body.
Figure 9:
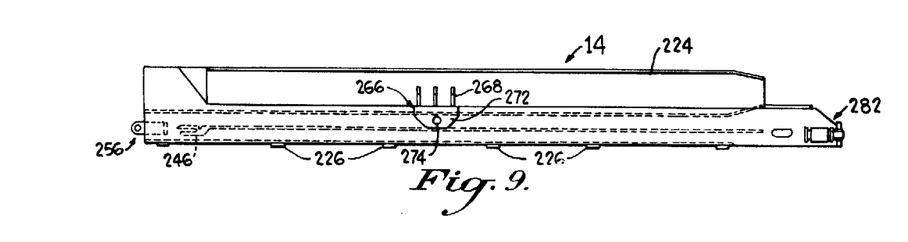
FIG. 9 is a view in side elevation of the vehicle body illustrated in FIG. 8.
Figure 9A:
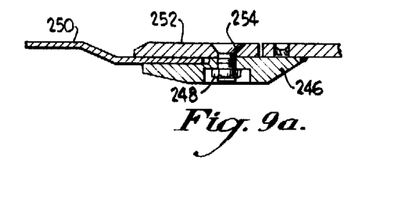
FIG. 9a is a fragmentary view in section, illustrating the manner in which the longitudinal flexible plates are connected to the front end of the vehicle body and rear end of the boom.

As illustrated in FIGS. 8 and 9a, the floor plates 236 and 242 have a transverse bar 246 secured thereto with a plurality of bolt holes 248 therethrough. A top plate 252 having mating bolt holes 254 is arranged to be secured to the transverse plate 246 and clampingly engage the rear end portion of the flexible plates 250 therebetween.

Figure 1A:
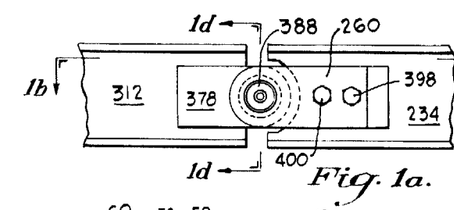
FIG. 1a is an enlarged fragmentary view in elevation of the device for attaching the vehicle boom to the vehicle body.
Figure 1B:
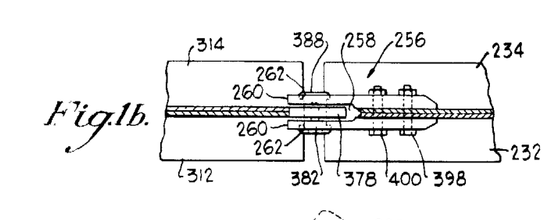
FIG. 1b is a view in section taken along the line 1b—1b in FIG. 1a, illustrating in detail the device for attaching the vehicle boom to the vehicle body.

Extending forwardly from the web portions of the channels 232 and 234 is a clevis or yoke 256 illustrated in detail in FIGS. 1a, 1b and 1c. The clevis 256 has a central recessed portion 258 and forwardly extending arms 260 with aligned apertures 262 therethrough. The portions of the clevis 256 are suitably bolted to the web portions of the channels as illustrated in FIGS. 1a and 1b. The clevis 256 is one portion of the attaching device for attaching the rear end portion of boom 16 to the front end portion of body 14.

Figure 10:
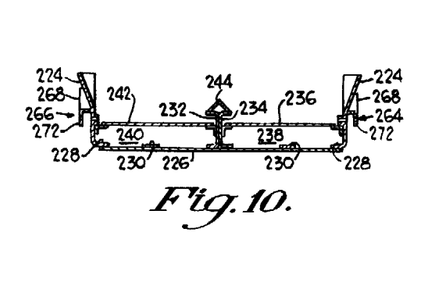
FIG. 10 is a view in section taken along the line X—X of FIG. 8.
Figure 10A:
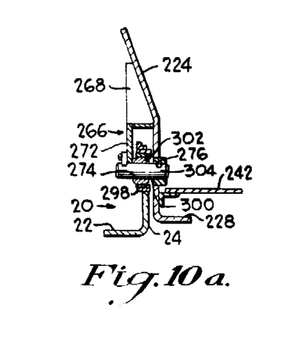
FIG. 10a is a fragmentary view in section, illustrating the manner in which the vehicle body is supported on the vehicle frame side members in the embodiment illustrated in FIGS. 1 - 10.

As illustrated in FIGS. 10 and 10a, the body 14 has angle members 264 and 266 depending from the outer portion of side walls 224 with reinforcing gussets 268 rigidly securing the angles 264 and 266 to the body side walls 224. The vertical portions 272 of angles 264 and 266 have apertures 274 therethrough that are aligned with mating apertures 276 in side walls 224. The detailed construction of the angle member 266 and body side wall 224 with the apertures therethrough is illustrated in FIG. 10a. The body member 14 has a pair of bumper connecting devices generally designated by the numeral 282 secured to the side walls 224 adjacent the rear of the body member 14. The body member 14 also has vertical bolt holes 284 through the flanges of the channel 234 adjacent the rear of the body 14 and vertical bolt holes 286 through the flanges of channel 232 adjacent the front end of the body 14.

As illustrated in FIGS. 1, 1c and 10a, body 14 is supported on the frame 12 by a four-point suspension wherein the front end of the body is connected to the frame 12 by means of an elongated bolt 288 extending through a mating bolt hole 292 in the intermediate axle assembly 188 and adjacent its rear end portion by an elongated bolt 294 extending through the bolt hole 284 in the web of channel 234 and a mating bolt hole 296 in the rear axle assembly 146. A fibrous pad 280 as, for example, a pad of brake lining material, is positioned between the webs of the channels 232 and 234 and the transverse plate 156 of the respective axle assembly to serve as a bearing member between the respective surfaces. The manner in which the body 14 is bolted to the axle assemblies substantially along its longitudinal axis is illustrated in FIGS. 1 and 1c in that the bolts 288 and 294 extend through the web portions of the channels 232 and 234 that are on the longitudinal axis of the body 14.

The body side portions 224 are supported from the vehicle frame side members 18 and 20 by the universal pin connection illustrated in FIG. 10a. The body 14 is positioned with depending channels 264 and 266 in overlying relation with the vertical portion 24 of the vehicle frame side members 18 and 20 and the apertures in the body side members 224 are aligned with mating apertures 298 in the upstanding leg or flange 24 of frame members 18 and 20. The apertures 298 in the frame vertical portion 24 have a semi-spherical socket 300 secured therein. A spherical bearing 302 is positioned in the socket 300 and has a pin 304 extending through the body side wall apertures 274 and 276 to thus provide a ball and socket connection between the body side walls and the frame side members. With this arrangement, when the haulage vehicle articulates or twists transversely the bolt connections to the axle assemblies being on the longitudinal axis of the body and haulage vehicle transmits a minimum deflection to the vehicle body. The ball and socket connections between the vehicle side frames and the vehicle body permit articulation within limits therebetween without transmitting twisting stresses to the vehicle body.

Figure 5:
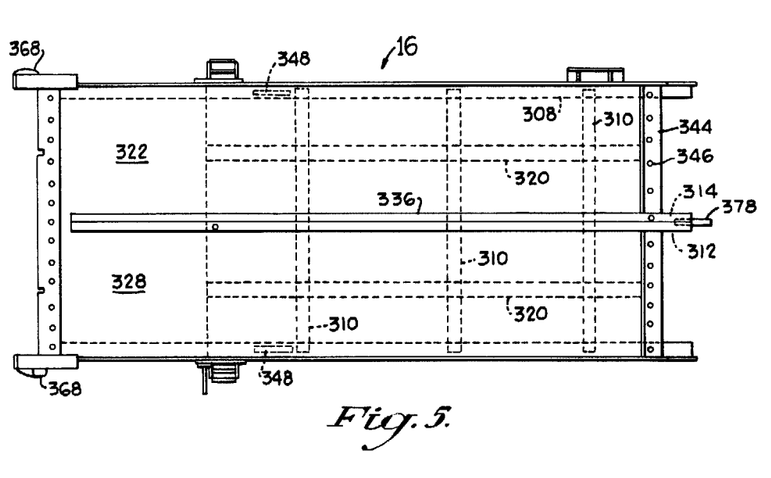
FIG. 5 is a top plan view of the vehicle boom.
Figure 6:
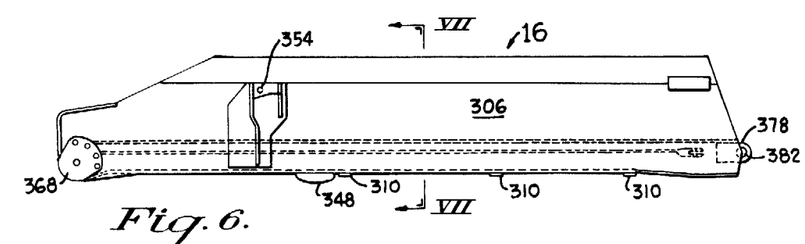
FIG. 6 is a view in side elevation of the vehicle boom illustrated in FIG. 5.
Figure 7:
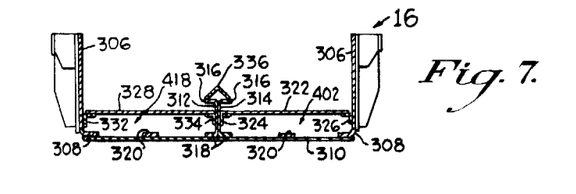
FIG. 7 is a view in section taken along the line VII—VII of FIG. 6.

The boom member generally designated by the numeral 16 is illustrated in detail in FIGS. 5, 6 and 7 and includes a pair of upstanding side walls 306 with inwardly extending flange portions 308. Transverse straps 310 are secured to the inwardly extending flange members. A pair of reinforcing straps 320 are secured to the transverse straps 310 and support the return reach of the endless conveyor. A pair of abutting channels 312 and 314 extend longitudinally along the boom member on the longitudinal axis thereof and are arranged with the upper and lower flanged portions 316 and 318 extending outwardly therefrom. A longitudinal floor plate 322 is supported by a pair of angles 324 and 326 secured respectively to upstanding wall 306 and the web of channel 314. A similar floor plate 328 is supported on angles 332 and 334 secured respectively to the upstanding side wall 306 and the channel 312. An elongated angle bar 336 is secured to the flanges 316 on channel members 312 and 314. The rear end of the boom 16 has a transverse bar 344 connected to the vertical walls 306 with a plurality of bolt holes 346. The transverse bar 344 is similar to the bar 246 illustrated in FIG. 9a connected to the front end of the body member 14.

Figure 2:
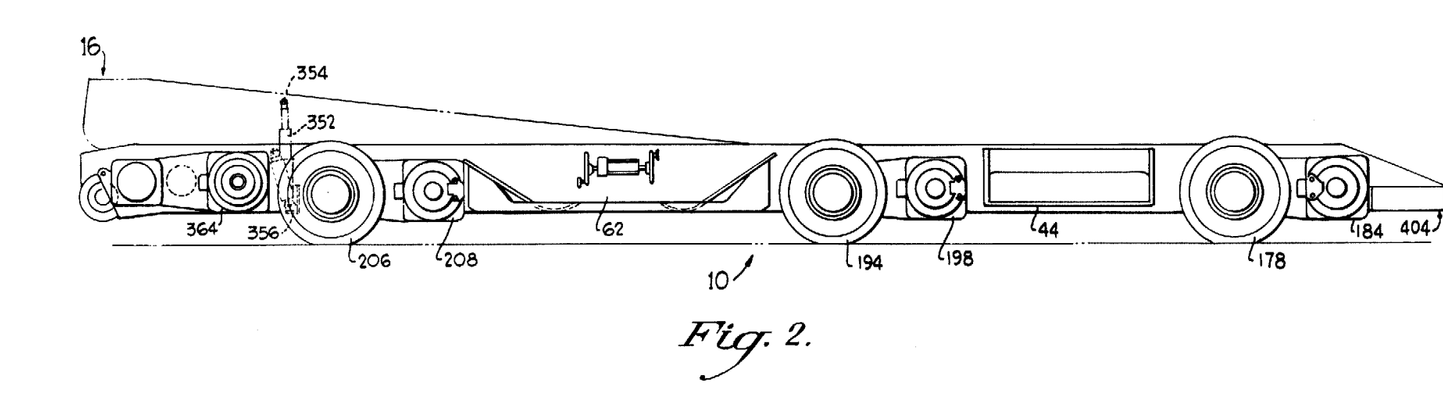
FIG. 2 is a view in side elevation of the haulage vehicle, illustrating in phantom lines the vehicle boom in an elevated material discharging position.

A pair of depending bearing pads 348 are connected to the plate 310 beneath the inturned flange portions 308 of side walls 306 and are arranged as illustrated in FIG. 1 to rest on the transverse front axle assembly 202. A pair of piston cylinder telescopic elevating jacks 352 illustrated in FIG. 2 are secured at one end to the boom 16 by means of suitable pins extending through apertures 354 and the other end of the jack is pivotally connected to the frame member at 356. With this arrangement, extension of the telescopic jack 352 lifts the front end of boom member 16 to the elevated discharge position illustrated in — — lines in FIG. 2.

A conveyor drive motor support 358 is secured to the boom side wall 306 and is arranged to support a gear reducer housing 362 with a motor 364 mounted thereon, as illustrated in FIG. 1. The gear reducer 362 and motor 364 are similar to the propelling motors and reducer housings previously described with reference to the propelling wheels and are preferably interchangeable therewith. A conveyor drive shaft 366 (FIG. 1) is rotatably supported in the boom member front end receivers 368 and has drive sprockets 372 thereon to rotate the drive shaft and sprockets and move the endless chain conveyors generally designated by the numerals 374 and 376. A cable support 370 is secured to the upstanding side walls 306 of boom 16 and has suitable pulleys therein for supporting the cable wound on the cable reel 390. The cable that provides power for the electrical components of the vehicle is not illustrated, since the cable reel and cable reel support are of conventional construction.

Figure 1D:
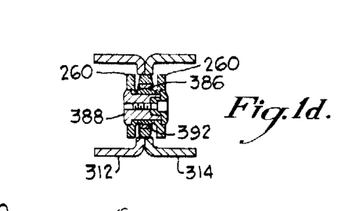
FIG. 1d is a view in section taken along the line 1d—1d in FIGS. 1 and 1a, illustrating the universal coupling portion of the device for attaching the vehicle boom to the vehicle body.

Connected to the channel members 312 and 314 adjacent the rear end thereof is a tongue-like strap member 378 with an aperture 382 therethrough. The strap 378 is arranged to be positioned between the arms 260 of clevis 256 illustrated in FIGS. 1a, 1b and 1d.

The boom member 16 is positioned on the frame member 12, as is illustrated in FIG. 1, with the bearing pads 348 resting on bearing surfaces of the front axle assembly 202. The forwardly extending flexible straps 250 secured to the front end of the body member 14 have their front end portions secured to the rear end of the boom 16 in a manner similar to that illustrated in FIG. 9a, so that the body 14 is connected to the boom 16 by means of a plurality of flexible straps 250. The straps 250 are preferably made of a high tensile flexible steel so that the straps 250 are free to flex as the boom 16 is elevated for discharge of the material in the haulage vehicle and to permit flexing and twisting of the haulage vehicle as the vehicle travels over uneven and undulating haulageway surfaces.

As illustrated in FIGS. 1, 1a, 1b and 1d, the strap 378 extending rearwardly from the boom webs 312 and 314 extends between the arms 260 of clevis 256 and has a spherical socket 386 therein. A pin member 388 has a semi-spherical portion 392 that mates with the semi-spherical socket 386. The pin member is secured in the clevis arms 260. It should be noted that the clevis arms 260 are secured to the webs 232 and 234 of the body channels by bolts 398 and 400 to permit the boom member 16 to be disengaged from the body member 14.

With the above described arrangement, the boom member 16 is supported by means of a three-point suspension comprising the bearing pads 348 and the strap 378 attached to clevis 256. With this arrangement, the transverse twisting of the frame due to uneven road surfaces is transmitted through the three-point support and the universal clevis connection illustrated in FIG. 1d permits twisting of the frame member 12 without transmitting the twisting stresses into the boom member 16. The straps 250 are flexible and capable of withstanding the twisting stresses as the vehicle travels over uneven road surfaces without transmitting the twisting stresses to the relatively rigid portions of the body member 14 and boom member 16.

With the haulage vehicle 10 above described it will be apparent that the propelling wheels 178, 194 and 206 are secured to the frame side members 18 and 20 in a manner that the vehicle wheels can follow uneven contours in the road surface and remain in contact therewith, so that all of the propelling wheels can provide traction for the haulage vehicle 10 and without imparting excessive twisting forces to the axle assemblies. Further, the sections 26 and 28 of the frame side member 18 and sections 32 and 34 of frame side member 20 are connected by a flexible strap means to permit twisting therebetween caused by the frame member following undulating road surfaces without imparting undue twisting stresses into the elongated frame members 18 and 20.

The body member 14 is supported on the frame member 12 by means of a four-point suspension indicated in FIG. 1 at the intersection of the lines — · — designated by the letters A, B, C and D. The side portions of the body 14 are connected to the frame members 18 and 20 by a universal connection 154 illustrated in FIG. 10a, so that the frame members 18 and 20 are free to twist and flex without transmitting the torsional forces to the body 14. The body 14 is connected to rear axle assembly 146 and intermediate axle assembly 188 by means of bolts 288 and 294 substantially along the longitudinal axis of the body 14 so that a minimum of the transverse deflection of the axle assemblies on undulating surfaces is transmitted to the body 14. The other remaining portion of the haulage vehicle, i.e., the boom member, is connected by the previously discussed three-point suspension to thus minimize the transmission of the twisting and flexing of the vehicle frame into the boom member 16.

The body member 14 has a longitudinally extending haulage compartment formed by the body side walls 224 and the floor plates 236 and 242 to thus form a generally U-shaped haulage compartment. The boom member 16 has a similar U-shaped haulage compartment formed by the side members 306 and floor plates 322 and 328. Between the floor plates 236 and 242 and the transverse straps 226 of body member 14 there is provided a pair of return flight compartments 238 and 240 (FIG. 10) and the boom member 16 has a similar pair of compartments 402 and 418 (FIG. 7) for the return flights of the endless chain conveyors 374 and 376. The endless chain conveyor 374 has transverse conveyor flights 375 that are arranged to slide on the upper surface of boom floor plate 322, flexible connecting plates 250 and body portion floor plate 236 to convey material longitudinally in the haulage compartment. The endless chain of conveyor 374 is reeved about a drive sprocket 327 on drive shaft 366 adjacent the front end of the boom and reeved about a return idler sprocket beneath the bumper 404. The return idler is not shown. Similarly, the endless conveyor 376 has conveyor flights 377 that slide on the upper surface of boom floor plate 328, the flex straps 250 and the body floor plate 242. The return reaches of the endless conveyors 374 and 376 move through the compartments 238 and 240 of body member 14 and compartments 402 and 418 of boom member 16. With this arrangement, the endless conveyors 374 and 376 are arranged to distribute the material discharged into the rear portion of the haulage vehicle and also to discharge the material from the haulage compartment through the open front end portion of the boom 16.

Figures 8A, 8B:
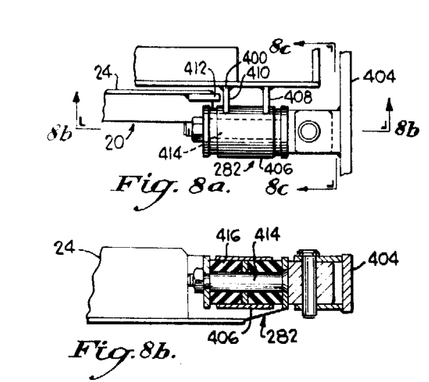
FIG. 8a is a fragmentary view of the bumper connecting apparatus.
FIG. 8b is a view in section taken along the line 8b—8b in FIG. 8a, illustrating in detail the resilient shock absorbing portion of the bumper connecting apparatus.
Figure 8C:
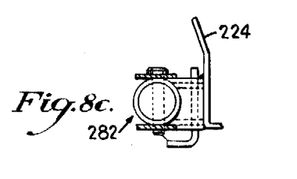

The bumper 404 illustrated in FIG. 1 is connected to the body 14 by means of the bumper connecting device 282 shown in FIGS. 8, 8a, 8b and 8c. The bumper support device includes a cylindrical member 406 secured to the body side wall 224 by plates 408 and 410. Both of the frames 18 and 20, as illustrated in FIG. 8a with reference to side frame member 20, have an abutment member 412 secured thereto with a rear edge 400 closely adjacent to plate 410 to receive forces transmitted from the bumper 404 through a pin 414 and resilient cushion member 416. With this arrangement, forces exerted on the bumper 404 are taken up by the resilient cushioning member 416. If the forces exerted on the bumper are substantial, the excessive force is transmitted through plate 410 into abutment member 412 on the frame member 20. The abutment member 412 is so arranged that the excessive forces are transmitted from the bumper to the longitudinal members of frames 18 and 20 without distorting the body member 14.

EMBODIMENT ILLUSTRATED IN FIGS. 14 – 17

Figure 14:
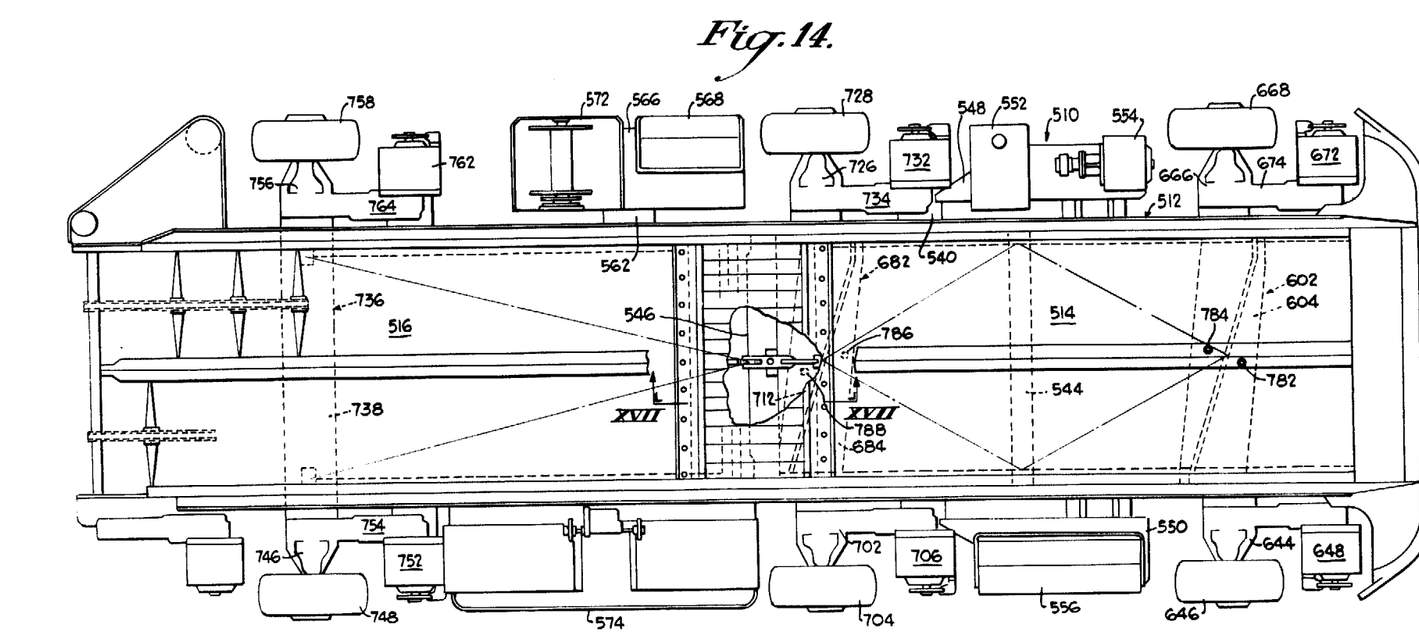
FIG. 14 is a top plan view of another embodiment of the haulage vehicle.
Figures 15, 15A, 17, 17A:
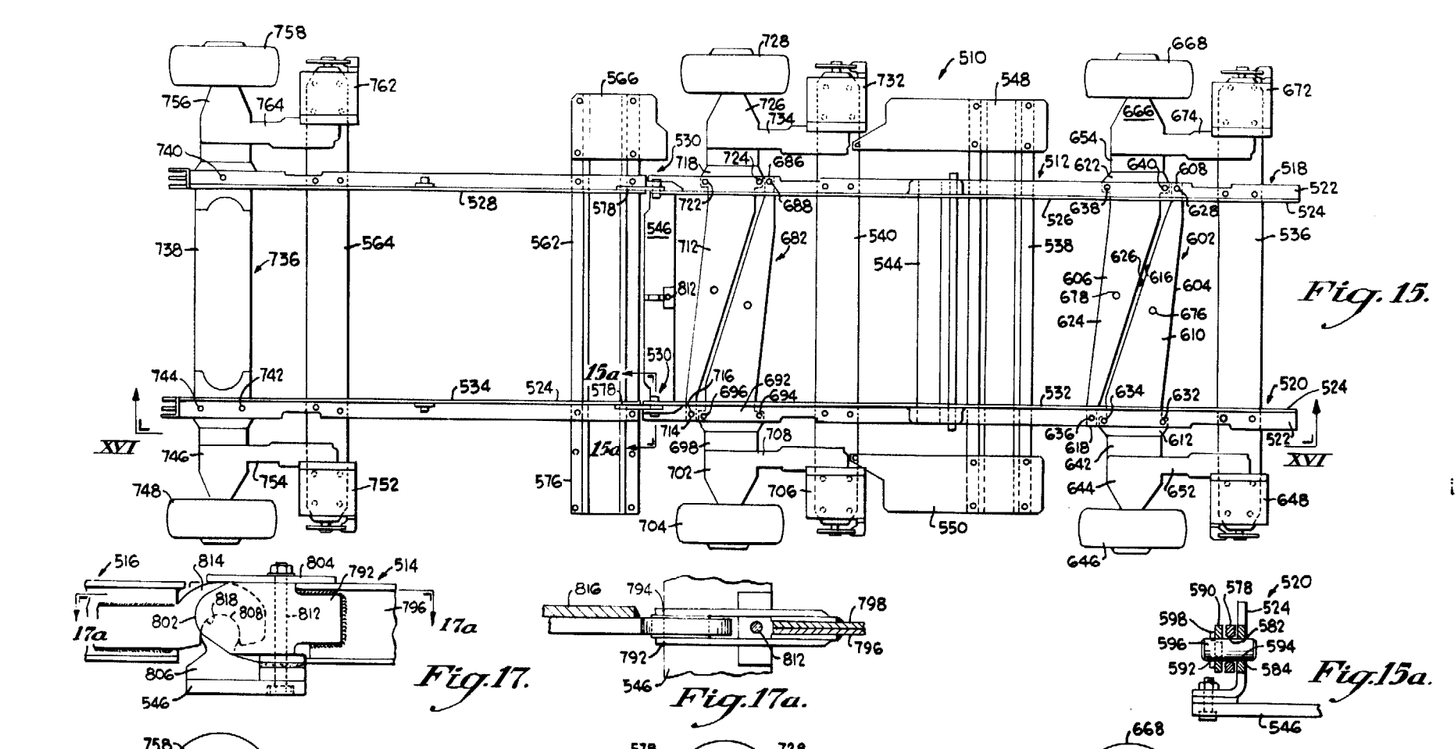
FIG. 15 is a top plan view of the frame of the embodiment illustrated in FIG. 14.
FIG. 15a is a fragmentary view in section taken along the line 15a—15a in FIG. 15, illustrating the connection between the frame side member sections in the embodiment illustrated in FIGS. 14 and 15.
FIG. 17 is a view in section taken along the line XVII—XVII in FIG. 14, illustrating the manner in which the boom rear end portion and the body front end portion are supported on a transverse plate on the vehicle frame.
FIG. 17a is a fragmentary plan view in section taken along the line 17a—17a of FIG. 17.

In FIGS. 14 – 17 there is illustrated another embodiment of the haulage vehicle 510 that includes a frame member 512 on which a body member 514 and a boom member 516 are supported. The body member 514 is similar in many respects to the body member 14 previously described and illustrated in FIGS. 8 and 9. The boom member 516 is substantially the same as the boom member 16 previously described and illustrated in FIGS. 5 and 6. The principal differences between the embodiment of the haulage vehicle 10 previously described and the embodiment of the haulage vehicle 510 illustrated in FIGS. 14 – 17 are the manner in which the frame side member sections are connected to each other. The connection for the frame side members is illustrated in FIGS. 15 and 15a. The axle assemblies also differ from the previously described axle assemblies in that the hereinafter described axle assemblies are formed by two separate plates rigidly connected to the frame side members. The hereinafter described axle assemblies are illustrated in detail in FIG. 15. The body member 514 is supported on a transverse body supporting beam connected to the side frame members rather than by the universal connections illustrated in FIGS. 10 and 10a and previously described. In the hereinafter described embodiment the front end of the body member 514 is bolted to a transverse bar portion of the frame and is illustrated in FIGS. 17 and 17a. The rear portion of the boom is supported solely by the transverse bar portion of the frame.

It should be understood that a haulage vehicle in accordance with the herein described invention may include some or all of the features of the embodiment illustrated in FIGS. 1 – 12 and/or include some or all of the features of the embodiment illustrated in FIGS. 14 – 17 without departing from the hereindescribed invention. For example, the flexible connection 30, previously described, for the frame members could be substituted for the universal connection illustrated in FIG. 15a or the axle assemblies of the embodiment illustrated in FIGS. 15 – 17 could be substituted for the previously described axle assemblies of the embodiment illustrated in FIGS. 1 – 12.

The haulage vehicle 510 has a unitary frame member 512 supporting the body member 514 and boom member 516. The frame member 512 is illustrated in detail in FIGS. 15 and 16 and includes a pair of spaced parallel and longitudinally extending side frame members generally designated by the numerals 518 and 520. Both of the side frame members have an angular configuration in elevation with a horizontal flange or base portion 522 and a vertical flange or wall 524. The right side frame member 518 has a rear section 526 and a front section 528 that are connected to each other by means of a universal connecting device generally designated by the numeral 530. Similarly, the left side frame member 520 has a rear section 532 and a front section 534 with the sections connected to each other by a similar universal connecting device 530. The rear side frame sections 526 and 532 are connected in spaced parallel relation to each other by transverse beams 536, 538 and 540. The side frame member sections 526 and 532 have suitable receivers generally designated by the numeral 542 therein that are illustrated in detail in FIGS. 16a and 16b and are arranged to receive a transverse body supporting beam 544 therein. As later described, the transverse supporting beam 544 supports the body member 514 intermediate the end portions thereof.

The frame member 512 includes another transverse beam 546 secured to the frame rear sections 526 and 532 adjacent the universal connecting device 530. The transverse beam 546 is arranged to support the rear end of the boom 516 by means of the connecting device illustrated in FIGS. 17 and 17a.

The transverse beam 536 extends beyond the frame side members 518 and 520 and is arranged to support the drive motors for the pair of rear propelling wheels. The beam 538 also extends beyond the frame side members 518 and 520 and has pads 548 and 550 thereon. The pad 548 is arranged to support an oil tank 552 and a hydraulic pump 554 as illustrated in FIG. 14. The pad 550 is arranged to support the traction control box 556. The transverse beam 540 is arranged to support the drive motors for the intermediate propelling wheels.

The side frame front sections 528 and 534 are connected to each other in spaced parallel relation by means of beams 562 and 564. The beam 562 extends beyond the side frame members 518 and 520 and has a pad 566 thereon that, in turn, supports a controller 568 and a portion of the cable reel housing 572. The operator's compartment 574 is supported by the end portion 576 of transverse beam 562. The wiring, hydraulic hoses and steering apparatus have been omitted from the embodiment illustrated in FIGS. 14 – 17 to more clearly illustrate the novel structure features of the haulage vehicle 510.

Figure 16:
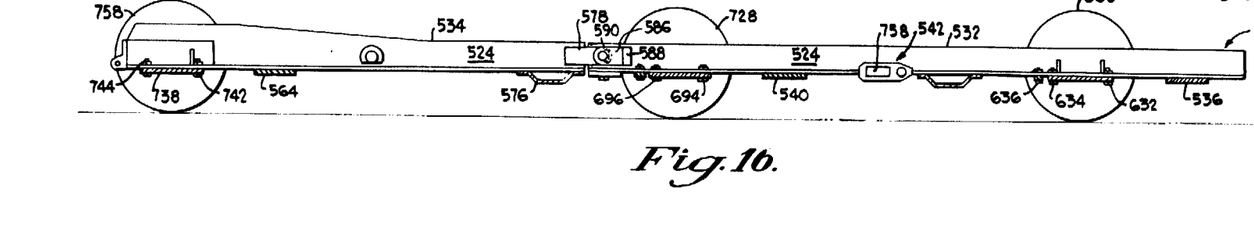
FIG. 16 is a view in section and side elevation taken along the line XVI—XVI in FIG. 15.

The universal connecting device for connecting the respective frame rear sections 526 and 532 to the frame front sections 528 and 534 is illustrated in detail in FIGS. 15, 15a and 16 and will be described in reference to the left side frame member 520. It should be understood that the universal connecting device 530 connecting the sections of the right side frame member 518 is of similar construction. The universal connecting device 530 includes a first strap member 578 secured to the vertical flange 524 of the side frame front section 534 and extends rearwardly therefrom. The strap member 578 has an aperture 582 therethrough and the inner peripheral wall 584 of the aperture 582 has an arcuate configuration as viewed in section in FIG. 15a.

A second strap member 586 has a body portion 588 secured to the vertical flange 524 of the frame side member rear section 532. A tongue portion 590 extends forwardly in spaced relation to the vertical flange 524 of frame side member 520. The tongue portion 590 has an aperture 592 therethrough that is aligned with an aperture 594 in the frame side member upstanding flange 524.

To connect the front and rear side frame sections 532 and 534 to each other the respective apertures 592, 582 and 594 are aligned and a pin member 596 is positioned in the respective apertures. The pin connection between the respective strap 578 and the tongue portion 590 and side frame 524 permits the front section 534 of the side frame 520 to articulate in a vertical plane. The inner arcuate peripheral surface 584 of aperture 582 permits transverse twisting or rotation of the respective side frame member sections 532 and 534 to each other. Thus, with the universal connecting devices 530 connecting the respective sections of the side frames 518 and 520, the frame sections are free to articulate in both longitudinal and transverse planes, so that the propelling wheels are free to follow undulating road surfaces and remain in contact therewith to provide traction to the haulage vehicle through all of the propelling wheels. The pin member 596 is suitably secured in the aperture of the side frame upwardly extending flange 524 and has a ring member 598 secured in a suitable recess to maintain the side frame sections connected to each other.

It should be understood that one side frame of the haulage vehicle can employ a universal connecting device similar to the universal connecting device 530 and the other side frame employ a universal connecting device similar to the flexible strap type connecting device illustrated in FIGS. 11 and 12. With the universal connecting device 530 the front sections of the frame member 512 may be quickly disconnected from the rear sections by removing the pins 596. This quick disconnect feature permits rapid assembly and disassembly of the haulage vehicle 510.

Referring to FIGS. 14 and 15, the axle assemblies for supporting the propelling wheels and the manner in which the axle assemblies are connected to the frame member is illustrated. A rear axle assembly generally designated by the numeral 602 extends transversely between the frame members 518 and 520 and includes a pair of plate members 604 and 606. The plate member 604 has a narrow end portion 608, an intermediate portion of increasing width 610 and a connecting portion 612 beneath the horizontal flange 522 of frame side member 520. The intermediate portion 610 has a generally angular configuration in plan as viewed in FIGS. 14 and 15 with an inner side edge 616 that converges toward the narrow end portion 608. The plate 606 has substantially the same configuration with a narrow end portion 618 positioned below the horizontal flange 522 of side frame 520 and a relatively wide connecting end portion 622 beneath the flange 522 of side frame 518. The intermediate portion 624 has an angular configuration in plan with a side edge 626 converging toward the narrow end portion 618.

The narrow end portion 608 of plate 604 is secured to the flange 522 of side frame 518 by bolt 628 and the opposite connecting portion 612 is secured to the flange 522 of side frame 520 by a pair of bolts 632 and 634. The plate 606 is positioned with the angular side edge 626 adjacent to and spaced slightly from the angular side edge 616 of plate 604 and has the narrow end portion 618 secured to the flange 522 by a second bolt 636 and the connecting portion 622 secured to the flange 522 of side frame 518 by bolts 638 and 640. With this arrangement, the axle assembly 602 comprises a pair of angular plates 604 and 606 with their narrow end portions 608 and 618 connected to opposite side frames 518 and 520.

The plate 604 has a wheel unit support portion 642 extending outwardly beyond the left side frame 520 and has a wheel unit 644 supported thereon. A driven and steerable rear left wheel 646 is mounted on the driven and steerable wheel unit to support the left rear end portion of the vehicle frame 512. A drive motor 648 is supported on a portion of the transverse beam 536 and is connected to the wheel unit 644 through gearing in housing 652. Similarly, the adjacent plate 606 of axle assembly 602 has a wheel unit support portion 654 extending beyond the side frame 518 and supporting a driven, steerable wheel unit 666. A propelling wheel 668 is mounted on the wheel unit 666 and supports the rear left end of the vehicle frame 512. A propelling motor 672 is supported on the extending portion of transverse beam 536 and is drivingly connected to the wheel unit 666 through gearing in housing 674. With this arrangement, the axle assembly 602 supports a pair of propelling wheels 646 and 668 and permits the plate portions 604 and 606 to twist longitudinally as the propelling wheels 646 and 668 move over uneven, undulating road surfaces. The angular portions 610 and 624 of the respective plates 604 and 606 permit the plates to twist without imparting excess twisting stresses in the respective plates or in the respective frame members 518 and 520. The axle assembly plate 604 has a bolt hole 676 therethrough adjacent the longitudinal axis of the haulage vehicle 510. Similarly, the rear axle assembly plate 606 has a bolt 678 on the opposite side of the vehicle longitudinal axis adjacent to the vehicle longitudinal axis. The bolt holes 676 and 678 are arranged to secure the rear portion of the body to the rear axle assembly 602.

The intermediate axle assembly 682 has substantially the same configuration as the rear axle assembly 602 and will not be described in detail. The axle assembly 682 has a plate 684 with the narrow end portion 686 secured to the flange 522 of the side frame 518 by a bolt 688 and a connecting portion 692 connected to the flange portion 522 by a pair of bolts 694 and 696. The plate 684 has a wheel unit support portion 698 to which an intermediate left wheel unit 702 is secured. The driven and steerable wheel unit 702 has an intermediate left propelling wheel 704 mounted thereon. A propelling motor 706 is supported on an end portion of transverse beam 540 and is drivingly connected to the wheel unit 702 through gearing in housing 708. The axle assembly 682 has a second angular plate 712 with the narrow end 714 secured to the horizontal flange 522 of side frame 520 by a bolt 716. The relatively broad connecting portion 718 of plate 712 is secured to the horizontal flange 522 of side frame 518 by bolts 722 and 724. A driven and steerable wheel unit 726 is supported on the end portion of plate 712 extending beyond the side frame 518 and has a propelling wheel 728 mounted thereon. A drive motor 732 is supported on an end portion of transverse beam 540 and is drivingly connected to the wheel unit 726 by gearing in housing 734. With this arrangement, the intermediate propelling wheels 704 and 728 follow undulating, uneven road surfaces and the angular configuration of plates 684 and 712 permit torsional twisting of the respective plates as the wheels follow uneven road surfaces.

A front axle assembly 736 has a unitary plate member 738 extending transversely to the side frame members 518 and 520 and is connected to the horizontal flange 522 of side frame 518 by a bolt 740. The transverse beam 538 is connected to the horizontal flange 522 of side frame 520 by a pair of bolts 742 and 744. A driven and steerable wheel unit 746 is supported on an end portion of the plate 738 and has a driven and steerable propelling wheel 748 mounted thereon. A front left propelling motor 752 is supported by an end portion of transverse beam 564 and is drivingly connected to the wheel unit 746 through gearing in housing 754. Similarly, a driven and steerable wheel unit 756 is supported on the other end of the transverse plate 738 and has a right front driven and steerable propelling wheel 758 mounted thereon. A drive motor 762 for propelling wheel 758 is mounted on end portion of transverse beam 564 and is drivingly connected to the wheel unit 756 through gearing in housing 764.

With this arrangement, the front propelling wheels 748 and 758 are connected to the front axle assembly 736 and the axle assembly which has a relatively rigid plate 738 is rigidly connected to the side frames 518 and 520. The front propelling wheels 748 and 758 follow uneven, undulating road surfaces and the vertical deviation of the respective wheels is transmitted back through the plate 738 to the side frame front members 528 and 534. The universal connecting means 530 between the respective side frame sections takes up the transverse deviation of the frame sections as the wheels follow the uneven, undulating road surface, so that twisting forces are not transmitted into the frame members 518 and 520.

It should be understood, however, where desired, the front axle assembly 736 may have a configuration similar to the intermediate axle assembly 682 or rear axle assembly 602 to permit twisting of the sections of the axle assembly. The front axle assembly 736 may, on the other hand, be connected to the side frames 518 and 520 in a manner similar to the axle assembly 202 previously described with reference to FIGS. 1 – 12. It should also be understood that an axle assembly similar to the axle assemblies 146, 188 and 202, as described in reference to the embodiment illustrated in FIGS. 1 – 12 may be substituted for one or more of the axle assemblies illustrated in FIGS. 14 – 17.

Figure 16A:
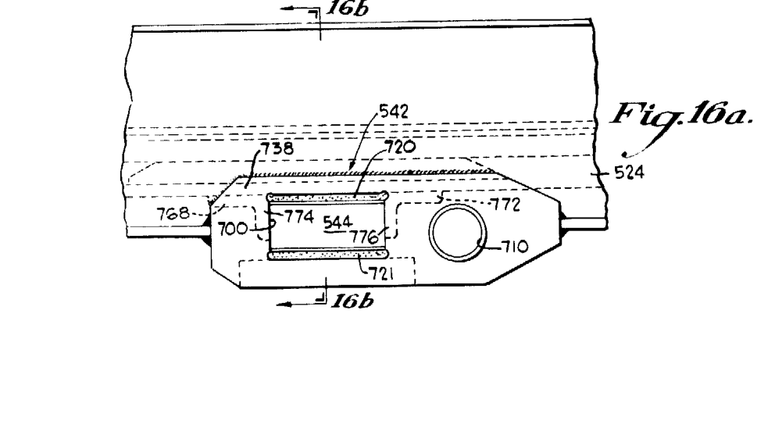
FIG. 16a is an enlarged fragmentary view of the cross member receiver in the vehicle side frame members with the cross member positioned therein and the vehicle body supported thereon.
Figure 16B:
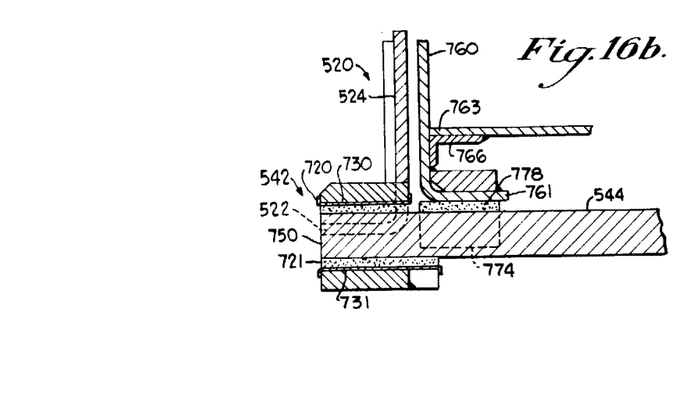
FIG. 16b is a fragmentary view in section taken along the lines 16b—16b in FIG. 16a illustrating the depending angle lugs on the bottom of the body to maintain the body in position on the cross member.

The side frames 518 and 520 have a portion of the horizontal flange 522 removed therefrom and a body supporting beam receiver 542 is secured therein and includes a plate 738 in each of the side frame members 518 and 520. The body supporting beam receiver plate 738 has a generally rectangular configuration with a rectangular opening 700 therein. The rectangular opening 700 has a greater vertical dimension than the dimension of the transverse body support beam 544 and has a steering shaft aperture 710. The body support receiver plates 738 are secured to the respective vertical flanges 524 of frame side members 518 and 520 and are arranged to support the transverse body support beam 544. Fibrous pads 720 and 721 fabricated from a material such as brake lining have clip members 730 and 731 secured to one surface. The fibrous pads 720 and 721 are secured in the aperture 700 in spaced horizontal relation to each other. The transverse body supporting beam 544 has an end portion 750 extending through the aperture 700 and is supported by the fibrous pads 720 and 721 to provide a relatively rigid transverse beam 544 supported in the frame side members 518 and 520.

The vehicle body member 514 is similar in construction to the body member 14 illustrated in FIGS. 8 – 10, with the exception that the body member 514 does not have the depending flanges 264 and 266 previously described. The body member 514 has vertical side walls 760, one of which is illustrated in FIG. 16b, with an inturned flange portion 761. An upper floor plate 763 is secured to the vertical wall 760 by means of an angle 766. Depending downwardly from the side wall inturned flange portion 761 are a pair of angle members 768 and 772 that are illustrated in dotted ( - - ) lines in FIG. 16a. The angles 768 and 772 are spaced from each other with the depending legs 774 and 776 spaced a dimension substantially equal to the width of the transverse body supporting beam 544. Fibrous pad 778 is secured to the underside of the wall inturned flange 761 between the angles 768 and 772 and is arranged to abut the upper surface of the transverse body supporting beam 544.

The vehicle body 514 has a first pair of apertures 782 and 784 therethrough (FIG. 14) adjacent the rear portion and a pair of apertures 786 and 788 adjacent the front end portion. The body 514 is positioned between the frame side members 518 and 520 with the intermediate portion of the body supported on the transverse body supporting beam 544. The depending legs 774 and 776 limit the longitudinal movement of the body 514 relative to the transverse body supporting beam 544. The bolt holes 782 and 784 are in overlying relation with the bolt holes 676 and 678 in axle assembly 602. Suitable bolts extend through the respective bolt holes to secure the body 514 to both plates of the rear axle assembly 602. Similarly, bolts extend through bolt holes 786 and 788 in body 514 and through the underlying bolt holes in the plates of intermediate axle assembly 682. With this arrangement, the body 514 is secured to the axle assemblies by means of the vehicle and supported intermediate the body end portions on the transverse body supporting beam 544 to provide a four-point suspension for the body 514 on frame 512 similar to the four-point suspension previously described with reference to the embodiment illustrated in FIGS. 1 – 12.

The body 514 has a pair of forwardly extending members 792 and 794, as illustrated in FIGS. 17 and 17a, connected to the opposite web portions 796 and 798 of the channel members that extend longitudinally on the body 514. The channel members are clearly illustrated in FIG. 10. The forwardly extending members 792 and 794 are arranged in spaced relation to each other and have arcuate front edge portions 802. A top plate 804 is arranged to be positioned in overlying relation with the web and connected to the transverse beam 546. The transverse beam 546 has an upstanding plate 806 with an outer semi-spherical edge 808 and an upstanding bolt 812.

The boom 516 is of substantially the same construction as the boom 16 illustrated in FIGS. 5 – 7 with the exception of the rearwardly extending strap 378. As illustrated in FIGS. 14 – 17 and 17a, the boom member 516 has a rearwardly extending hook-shaped member 814 secured to one of the vertical webs 816 of the channel members that extend longitudinally along the boom member 516. The hook-shaped member 814 has an arcuate semi-circular inner surface 818 which is arranged to be positioned in overlying relation with the circular portion 808 of upstanding member 806 that is secured to the transverse beam 546. The boom member 516 is connected to the frame member by means of the piston cylinder adjacent the front and, as previously described, has pad members which abut the front axle assembly 736. The rear end portion of the boom 516 is connected to and supported from the transverse beam 546 by means of the hook-shaped member 814 being positioned in overlying relation with the circular portion 808 of upstanding member 806. The forwardly extending members 792 and 794 of body 514 are positioned on opposite sides of the rearwardly extending hook member 814 to maintain the hook member 814 in overlying relation with the upstanding member 806. The plate 806 is positioned in overlying relation with the hook portion 814 and bolt 812 secures the plate member in position to maintain the hook member 814 in operative position between the members 792 and 794 and in overlying relation with the circular portion 808 of upstanding member 806. With this arrangement, both the boom rear end portion and the body front end portion are supported by the transverse beam 546 and are connected to each other solely by the flexible plates 822 in a manner similar to the flexible plates 250 as previously described.

With the above arrangement, it will be appreciated that the front portion of frame member 512 can be quickly disconnected from the rear portion by removing the transverse pins illustrated in FIG. 15a. Further, the boom 516 may be quickly disconnected from the frame 512 by removing the top plate 804 illustrated in FIG. 17.

According to the provisions of the patent statutes, we have explained the principle, preferred construction and mode of operation of our invention and have illustrated and described what we now consider to represent its best embodiments. However, we desire to have it understood, that within the scope of the appended claims, the invention may be practiced otherwise than as specifically illustrated and described.

We claim:

1. An articulated haulage vehicle comprising,
 a frame member having a front section and a rear section, each of said sections having a front portion and a rear portion,
 means connecting said frame member front section to said frame member rear section to permit articulation therebetween,
 said means connecting said frame member front section to said frame member rear section includes universal connecting means to permit articulation between said frame sections in a plurality of different planes,
 a pair of rear wheels mounted on opposite sides of said frame member rear section adjacent the rear portion of said frame member rear section,
 a pair of intermediate wheels mounted on opposite sides of said frame member rear section adjacent the front portion of said rear section,
 a pair of front wheels mounted on opposite sides of said frame member front section adjacent the front end portion of said frame member front section,
 a body member having a longitudinally extending haulage compartment therein, said body member mounted on said frame member rear section,
 a boom member having a longitudinal haulage compartment therein, said boom member mounted on said frame member front section, and
 flexible means connecting said boom member to said body member to permit articulation therebetween and forming an elongated longitudinal haulage compartment,
 said flexible means connecting said boom member to said body member includes means to permit articulation between said body member and boom member in a plurality of different planes.

2. An articulated haulage vehicle as set forth in claim 1 in which,
 said body member having a floor portion with a pair of side walls extending upwardly therefrom,
 said boom member having a floor portion with a pair of spaced side walls extending upwardly therefrom,
 said boom member floor portions include a rear edge portion,
 a transverse support member secured to said frame member rear section adjacent the front portion of said frame member rear section,
 a boom member connecting means extending upwardly from said transverse support member,
 said boom member having a connecting member extending rearwardly therefrom, said connecting member positioned in overlying relation with said upwardly extending boom member connecting means.

3. An articulated haulage vehicle as set forth in claim 2 in which,
 said boom member connecting means includes an upstanding portion with an arcuate upper edge portion,
 said connecting member having an arcuate lower portion with substantially the same configuration as said arcuate upper edge portion of said boom member connecting means,
 said connecting member arcuate lower edge portion positioned in overlying relation with said boom member connecting means arcuate upper edge portion.

4. An articulated haulage vehicle as set forth in claim 2 which includes,
 a plate member positioned in overlying relation to said connecting member,
 means connecting said plate member to said transverse support member.

5. An articulated haulage vehicle as set forth in claim 2 in which,
 said boom member is supported on said frame member on said transverse support member and on each of the frame member side members adjacent to said pair of front wheels.

6. An articulated haulage vehicle as set forth in claim 1 in which,
 said frame member includes a pair of spaced longitudinally extending side frame members,
 transverse axle assemblies secured to said side frame members and extending outwardly beyond said side frame members,
 wheel units secured to the ends of said transverse axle assemblies, each of said wheel units having a wheel mounted thereon.

* * * * *